United States Patent [19]

Ikeuchi et al.

[11] Patent Number: 5,899,989

[45] Date of Patent: May 4, 1999

[54] ON-DEMAND INTERFACE DEVICE

[75] Inventors: Hiroshi Ikeuchi, Tenri; Ikuo Keshi, Nara; Kenichi Kuromusha, Tenri, all of Japan

[73] Assignee: Sharp Kabushiki Kaisha, Osaka, Japan

[21] Appl. No.: 08/847,809

[22] Filed: Apr. 25, 1997

[30] Foreign Application Priority Data

May 14, 1996 [JP] Japan ..................................... 8-118602

[51] Int. Cl.⁶ .................................................... G06F 17/30
[52] U.S. Cl. .................................. 707/3; 707/1; 707/100; 704/3; 704/9; 704/10
[58] Field of Search .................................. 707/3, 104, 2; 704/9; 364/513

[56] References Cited

U.S. PATENT DOCUMENTS

| | | | |
|---|---|---|---|
| 4,817,036 | 3/1989 | Millett et al. | 707/1 |
| 5,181,163 | 1/1993 | Nakajima et al. | 704/10 |
| 5,197,005 | 3/1993 | Shwartz et al. | 707/2 |
| 5,268,839 | 12/1993 | Kaji | 704/3 |
| 5,317,507 | 5/1994 | Gallant | 707/532 |
| 5,442,780 | 8/1995 | Takanashi et al. | 707/1 |
| 5,551,036 | 8/1996 | Kiyama et al. | 395/705 |
| 5,600,833 | 2/1997 | Senn et al. | 707/1 |
| 5,684,999 | 11/1997 | Okamoto | 704/9 |
| 5,694,559 | 12/1997 | Hobson et al. | 345/336 |
| 5,734,837 | 3/1998 | Flores et al. | 705/7 |
| 5,742,829 | 4/1998 | Davis et al. | 395/712 |
| 5,761,666 | 6/1998 | Sakai et al. | 707/100 |

*Primary Examiner*—Paul R. Lintz
*Assistant Examiner*—Ella Colbert
*Attorney, Agent, or Firm*—Nixon & Vanderhye, P.C.

[57] ABSTRACT

The present invention is intended to provide an on-demand interface device which is capable of retrieving a function corresponding in meaning to an inputted request sentence and easily executing the retrieved function. The on-demand interface device comprises a function-description database containing function-descriptive sentences for respective functional items and action scripts for realizing respective functions, retrieving means for retrieving a functional item corresponding to a requesting sentence inputted through an input means, script executing means for realizing the retrieved function by executing a corresponding script. The retrieving means can conduct the retrieval of keywords as well as the retrieval of a requesting function by determining an inner product of two sentence vectors, i.e., of a request and each of function-descriptions for respective functional items.

6 Claims, 6 Drawing Sheets

FIG.2

| FUNCTION NAME | FUNCTION-DESCRIPTION | OPERATION PROCEDURE DESCRIPTION | ACTION SCRIPTS |
|---|---|---|---|
| CENTERING | MOVE A CHARACTER TO CENTER OF A LINE | AFTER SPECIFYING A CHARACTER STRING CHOOSE "CENTERING" IN EDIT MENU | GetString()<br>OpenMenu(EDIT)<br>Choose(CENTERING) |
| PRINT | PRINT-OUT A DOCUMENT ON A PRINTER | CHOOSE "PRINT" IN A FILE MENU | OpenMenu(FILE)<br>Choose(PRINT) |
| SAVE | STORE A DOCUMENT IN A FILE | CHOOSE "SAVE" IN A FILE MENU | OpenMenu(FILE)<br>Choose(SAVE) |
| --- | --- | --- | --- |

| WORDS | WORD VECTORS |
|---|---|
| MOVE | (0,0,1,1,0,1,0,0,0) |
| PRINT | (0,1,0,0,1,0,0,0,1) |
| PRINTOUT | (0,1,0,0,1,0,0,0,1) |
| OUTPUT | (0,1,0,1,1,0,0,0,0) |
| PAPER | (1,1,0,0,1,0,0,0,1) |
| LINE | (0,1,1,1,0,0,0,0,0) |
| CENTER | (0,0,1,1,0,0,0,0,0) |
| MARK | (0,0,1,0,0,0,1,1,0) |
| CONTENT | (1,1,1,0,0,0,0,0,0) |
| CHARACTER | (1,1,0,0,0,0,1,0,1) |
| ARROW | (1,0,1,1,0,0,1,0,0) |
| TRANSPORT | (0,0,1,0,0,1,0,0,0) |

ON-DEMAND INTERFACE DEVICE

BACKGROUND OF THE INVENTION

Recently, computer software for use in word processors and home electronics (e.g., video-decks) contains a so-called assist-function or help-function that displays a description of operation of the device whenever a user requests it by pressing a help key. The help function selectively displays help-information in accordance with the operating stage when the user pushed the help key. Thus the user can easily perform any necessary function at any desired time without being acquainted with all steps for operating a system or a device.

In any system having an increasing number of functions, it is rather difficult for the user to find necessary information among a large number of listed items on a display. Therefore, the system is requested to correctly understand a function requested by the user and to display corresponding operation instruction.

Japanese Laid-Open Patent Publication No. 7-121563 discloses a help-information retrieving device that receives a keyword inputted after a Help key operation and retrieves suitable help information from a database by the keyword and displays the found information.

The above-mentioned help-information retrieving device allows the user to carry out an objective function by performing necessary operations according to the instruction displayed. With multiplication of functions to be realized in a system or device, it becomes difficult to design such a system that may realize all functions by simple operations. In other words, the user must carry out a plurality of steps to realize a desired function. The correct procedure for realizing a desired function may be given to the user but is troublesome for the user to do every time.

The above-mentioned help-information retrieving device retrieves information by getting a match of keywords. For example, a word processor having a printing function is given a keyword [print, print-out, printing] for retrieving the printing function whenever the user requests it with the keyword "print" or "print-out" or "printing". By matching correctly a keyword-code, it is also possible to design the retrieving system so that it retrieves the printing function by any one of two requests having the same meaning but written in different kinds of characters, e.g., Japanese Hiragana characters and Katakana characters.

With an entered request sentence, e.g., "outputting on paper", the keyword matching type retrieval system extracts keywords [outputting, paper] but can not search the printing function because they do not coincide with any one of the keywords [print, print-out, printing]. It is difficult to previously register all keywords that users may use in their requests. Thus, the retrieval by keywords has limitations of searching a function that matches the meaning of a requesting sentence entered by the user.

SUMMARY OF THE INVENTION

The present invention relates to an on-demand interface device which is capable of easily and correctly realizing a user's request for a help function for assisting a user in operating multi-functioning devices such as computer applications, office automation apparatuses and home electronics devices.

An object of the present invention is to provide an on-demand interface device which is capable of easily carrying-out an objective function found by help-information retrieval. Another object of the present invention is to provide an on-demand interface device which is capable of retrieving an objective function agreeing in meaning with a requesting sentence inputted by a user and of easily executing the found function.

The above-mentioned objects of the present invention are realized by providing an on-demand interface with means for automatically carrying a retrieved function. Namely, the on-demand interface device according to the present invention is featured in that it is provided with input means for inputting a request, a function-description database for containing function-descriptive sentences and action scripts indicating procedures for realizing respective functions for respective items, retrieving means for finding an item corresponding to an inputted request in the function-description database and script executing means for executing the action scripts.

The retrieving means can retrieve data by getting a match of a keyword of the request with a keyword of a function-description.

The retrieving means is provided with a word dictionary for indicating the relationship between words and corresponding words' vectors describing meanings of the words and vector-generating means for generating sentence vectors each representing a meaning of a sentence containing a plurality of words by using the word dictionary. The retrieving means retrieves a requested function by searching for a distance of the request-sentence vector from a function-descriptive sentence vector for each functional item stored in the function-description database. In this case, the retrieving means retrieves a requested function matching the meaning of a requesting sentence and executes it on behalf of the user who does not know a keyword.

BRIEF DESCRIPTION OF THE DRAWINGS

FIG. 2 is a view for explaining a function-description database.

PREFERRED EMBODIMENT OF THE INVENTION

Preferred embodiments of the present invention will be described below in detail with reference to the accompanying drawings.

An on-demand interface for use in a word processor is discussed as an illustrative example.

Figure 1:
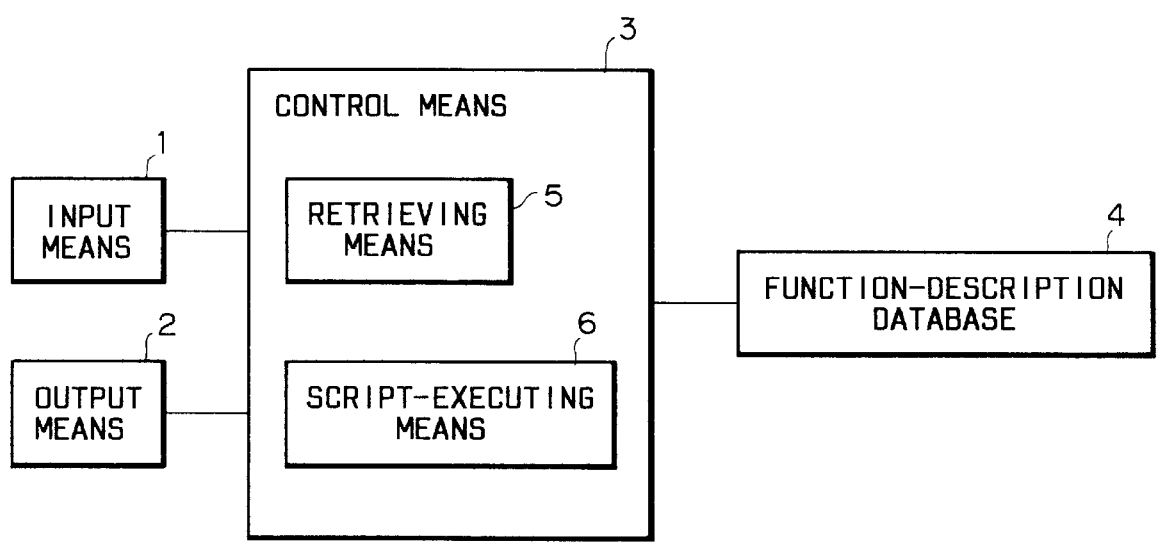
FIG. 1 is a schematic block diagram showing a construction of an interface device according to the present invention.

FIG. 1 is a schematic construction view of an on-demand interface device embodying the present invention. The device comprises input means 1 (e.g., a keyboard) for inputting a requesting sentence, output means 2 (e.g., a display unit), control means and a function-description database 4. The control means 3 controls hardware or software to realize functions of retrieving means 5 and script-executing means 6, which will be described later.

FIG. 2 shows an exemplified function-description database 4 wherein names of the word processor's functions such as "centering", "print", "save" are stored together with respective function-description, procedure description and action scripts expressing the respective operating procedures in the form enabling the system to automatically performing them.

Figure 3:
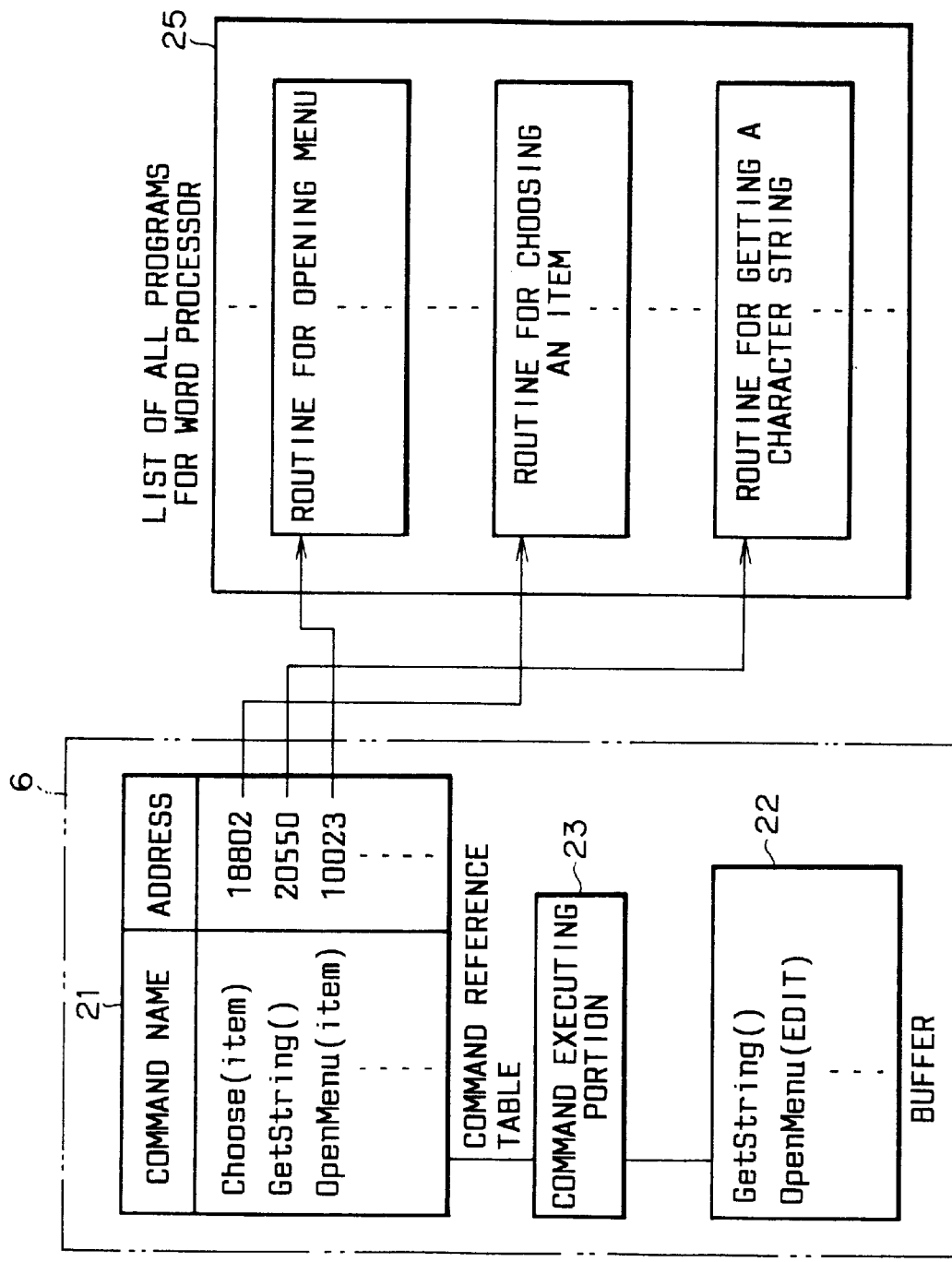
FIG. 3 is a view for explaining the construction and operation of a script-executing means.

FIG. 3 is a diagrammatic view for explaining the construction and the operation of the script-executing means 6. Script-executing means 6 comprises a command reference table 21, a buffer 22 for temporarily storing a command string (action script) and a command executing portion 23. The command reference table 21 contains, for example, command names (of a script) arranged in alphabetical order together with addresses of respective command executing routines in a program list 25 of all software of the illustrative word processor.

In FIG. 3, it will be known, for example, that a routine program corresponding to a script command "GetString( )" starts from address 20550. Now, the routine starting at address 10023 is assumed as a routine for opening a menu and a menu item to be opened is specified as an argument. A routine beginning at address 18802 is a routine for selecting an item from the opened menu and a desired item is specified as an argument. A routine beginning at address 20550 is a routine for getting character-string information, which outputs a message requesting the user to specify a desired character string and waits until the user specify the character string by using a pointing device such as a keyboard and mouse.

The buffer 22 temporarily stores therein a command string. The command executing portion 23 successively reads script commands accumulated in the buffer 22, knows an address corresponding to each command by referring to the command reference table and transfers control to the address. The above-described operations are repeated until the last one of commands in the buffer is read and executed.

Figure 4:
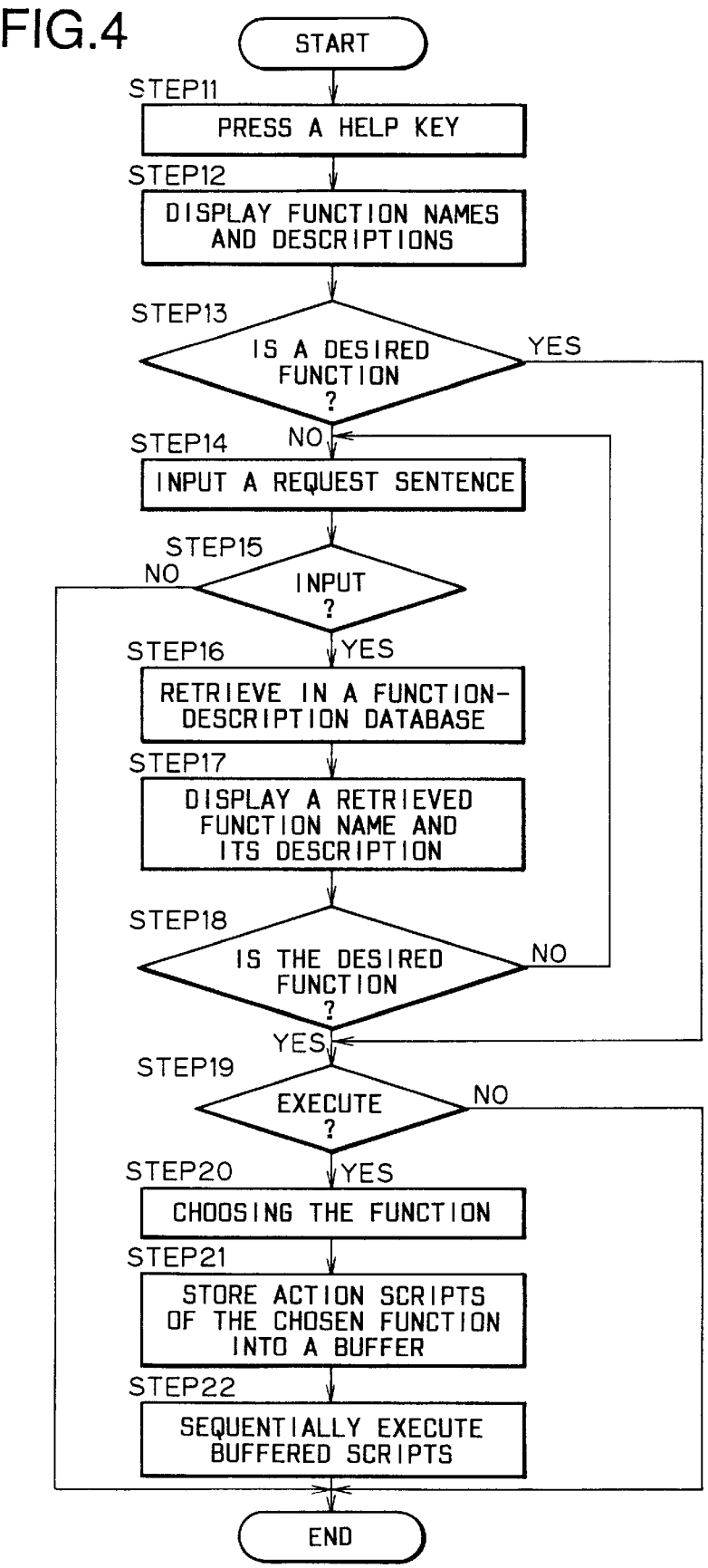
FIG. 4 is a flow chart describing the operation procedure to be performed by the interface device.

FIG. 4 is a flow chart describing a procedure of operations to be performed by the on-demand interface device according to the present invention.

When the user (who is confused with the word processor) a HELP key (Step 11), an edit function of the word processor is displayed together with its description by the action of a conventional help function according to the operation state of the processor (Step 12). At this time, the display may display one or more functions on its screen. When a desired function is found among functions indicated on the display (Step 13), the user is requested to judge whether to carry out (i.e., execute) the function (Step 19). In case of carrying-out the function found among functions indicated on the display, the desired one is specified (Step 20). After the function was designated, the retrieving means 5 stores the action script of the selected function into the buffer 22 (Step 21), then the script-executing means 6 executes one by one the scrip commands to realize the function (Step 22). The processing ends at Step 19 if the user only recognizes the function but did not require its execution.

If the desired function was not found among the functions indicated on the display by the conventional Help-function at Step 13, the control means 3 requires the user to input a requesting sentence through the input means 1 (Step 14). The processing ends if the user did not enter the requesting sentence (Step 15). When a requesting sentence is inputted, the retrieving means 5 finds a function corresponding to the requesting sentence in the function-description database 4 (Step 16) and indicates the retrieved function name and the relevant description on the output means 2 (Step 17). At this time, the display may display one or more functions on its screen. When a desired function exists among functions indicated on the display (Step 18), the user is requested to judge whether to carry out the function (Step 19).

In case of carrying-out the function found among a plurality of functions indicated on the display, the desired one is chosen (Stop 20). After the function was chosen, the retrieving means 5 stores the action script of the selected function into the buffer 22 (Step 21), then the script-executing means 6 executes one by one the action scrip commands stored in the buffer 22 to realize the function (Step 22). The processing ends at Step 19 if the user only recognizes the function but did not require its execution. If the desired function was not found among the functions indicated at Step 18, the processing returns to Step 14 to request the user to input another requesting sentence.

The retrieval operation of the retrieving means 5 using keywords will be more practically described in the context of retrieving a centering function used for editing text in a word processor. As described in the function-description database shown in FIG. 2, the centering function is a function to move a specified character string to the center of a line. The operation procedure comprising the steps of specifying a desired character string and selecting an item "Centering" from a menu item "Edition" by using a pointing device (e.g., a keyboard or a mouse).

A user who does not know the method for centering a title of a document presses the Help key on the keyboard of the word processor (Step 11). A functional description is outputted on a display unit by the action of a conventional help-function (Step 12), but it does not contain information on "Centering" (Step 13). The user then enters a sentence "Move to center" in response to an input request from the system (Step 14). The retrieving means 5 searches information corresponding to the inputted sentence in the function-description database 4 (Step 16).

In this instance, the retrieval is conducted by using keywords extracted from the requesting sentence and function name and functional description of the function-description database (these keywords may be written in all kinds of Japanese characters Kanji, Hiragana and Katakana). Accordingly, words "Move, Center" are extracted from the requesting sentence and words [Centering, Character, Line, Center, Move] are extracted from the "centering" function item of the database. Words [Print, Document, Printer, Print-out] are extracted from the "print" function item and words [Save, Document, File, Store] are extracted from the "save" function item. All extracted words are used as keywords for retrieval. The retrieval is carried out by AND-operation retrieval of the keywords extracted from the requesting sentence. In this case, the "centering" function item is retrieved by matching both keywords [Move, Center] extracted from the requesting sentence whilst the "print" function item and the "save" function item are not retrieved because no match is obtained between the keywords.

All function items in the function-description database were checked for matching the keywords and only the "centering" function item was retrieved. At Step 17, the "centering" function item is displayed as a result of retrieval on the output means 2. As this function is just needed by the user, the processing advances from Step 18 to Step 19 to select the execution of the function. The retrieving means 5 then copies the action script of the retrieved "centering" function item into the buffer 22 (Step 21) wherein, therefore, the following command string is stored: [GetString(), OpenMenu(EDIT), Choose(CENTERING)]

The script-executing means 6 sequentially executes the commands stored in the buffer 22 (Step 22). Namely, control is transferred to address 20550 according to the command GetString(), then control is transferred to address 10023 according to the command OpenMenu(EDIT) by using EDIT as an argument. Control is finally transferred to address 18802 according to the command Choose (CENTERING) by using CENTERING as an argument. The arguments HENSYU and CENTERING means items "EDITION" and "CENTRING" respectively.

The operation of the script-executing means 6 will be described again in accordance with the actions of the above-mentioned routines. At address 20550, the script-executing means 6 requests the user to specify the character string and waits till the user designates the character string. At address 10023, the script-executing means 6 opens the menu item "Edition" corresponding the argument (EDIT). At address 18802, the script-executing means 6 selects an item "centering" corresponding to an argument (CENTERING). The action sequence corresponds to the operation procedure of the centering function. Namely, the centering function is automatically executed by the script-executing means 6.

As described above, the function item "Centering" is fist retrieved according to the requesting sentence "Move to Center" and then the action script representing the centering operation procedure is automatically executed. In other words, inputting the requesting sentence "Move to Center" drives the retrieving means to retrieve the function item "Centering" and inputting the further request drives the script-executing means to automatically execute the centering function. Any other function can be retrieved and automatically performed in the same manner as described for the centering function. This means that the script-executing means executes, on behalf of the user, all required operations for realizing any desired function irrespective of the number of operation steps. Thus, the user can be released from troublesome operations with particularly complicated functions.

The above-described example treats with the case that one functional item is retrieved. If a plurality of functional items was retrieved, the user is requested to select adequate one of the retrieved items. After this, a relevant action script is copied and then executed. The OR-operation retrieval may also be applied to such a case if the AND-operation retrieval failed in finding a desired functional item. It is allowed that a plurality of keywords is previously given to each functional item and is stored in another buffer.

Figures 5, 6:
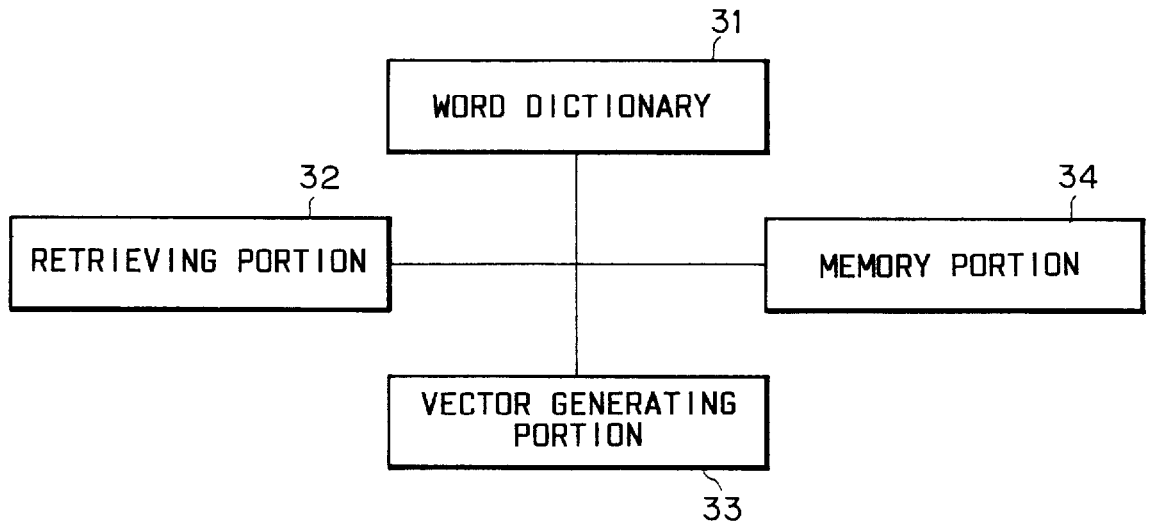
FIG. 5 is a schematic block diagram showing a construction of vector-retrieving means.
FIG. 6 shows a part of a word dictionary.

An example of applying a vector-retrieval system as the retrieving means will be described below:

FIG. 5 is a schematic block diagram showing a construction of vector-retrieving means that comprises a word dictionary 31 containing word vectors, a retrieving portion 32 for retrieving according to vectors, a vector generating portion 33 for generating vectors and a memory portion 34 for temporarily storing in buffers information necessary for retrieval operation.

FIG. 6 shows a part of the word dictionary 31 that contains words and vectors expressing meanings of respective words. The word vectors express meanings of words relative to N pieces of feature words. A list of feature words, e.g., [text, document, position, space, print, move, shape, memory, display] is now prepared for use in the embodiment to be described below. N-dimensional vectors are defined for each word by estimating (expressing) correlativity of a word with N pieces of feature words by many-valued digits or simply binary digits.

By way of example and to simplify the description the correlation of each word with a plurality of feature words is expressed by binary digits as follows:

A word "Character" is given 1 relative to feature words "Text", "Document", "Shape", "Display" since it has a correlation with them. However, the word "Character" is given 0 relative to feature words "Position", "Space", "Print", "Move", "Memory" since it has little or the correlation with them. Accordingly, a word vector expressing the word "Character" is defined as (1, 1, 0, 0, 0, 0, 1, 0, 1).

A large-scale word-vector generating method that uses an encyclopedia reflecting human's knowledge is proposed in paper "Associative retrieval using a large-scale document database", TECHNICAL REPORT OF IEICE AI92-99 (1993-1) (THE INSTITUTE OF ELECTRONICS, INFORMATION AND COMMUNICATION ENGINEERS).

A sentence vector will be described taking an example of a vector representing a sentence "Printout a document on a printer". A sentence vector is produced by extracting meaningful words from a sentence, summing-up respective word vectors and normalizing the obtained result. Words may be extracted by any of known methods, e.g., by getting a match of a character string in a word dictionary or by monophological analysis.

In this example, three words "document", "printer" and "printout" are extracted. They have respective word vectors, i.e., (1, 1, 0, 0, 0, 0, 0, 0, 0), (0, 1, 0, 0, 1, 0, 0 , 0 , 1) and (0, 1, 0, 0, 1, 0, 0, 0, 1). Vectors are added to each other to obtain a resultant vector (1, 3, 0, 0, 2, 0, 0, 0, 2). The resultant vector is normalized to obtain a vector for sentence "Printout a Document on a Printer". The normalization is to make a vector be equal to a specified length. In this example, the vector is normalized to a length of 10 to obtain a sentence vector V as follows:

$$\begin{aligned} V &= (10/L)\,(1, 3, 0, 0, 2, 0, 0, 0, 2) \\ &= (2.4, 7.1, 0.0, 0.0, 4.7, 0.0, 0.0, 0.0, 4.7) \\ L &= (1^2 + 3^2 + 0^2 + 0^2 + 2^2 + 0^2 + 0^2 + 0^2 + 2^2)^{1/2} = 18^{1/2} \end{aligned}$$

The retrieval method is as follows:

Two sentences are now given to be checked for similarity to each other by comparing their vectors. They are considered to be of high similarity if their vectors' directions are approximate to each other, which approximation is expressed by an inner product of their vectors since the sentence vectors has been normalized. Namely, these two sentences have high similarity if they have a large inner product. Accordingly, an inner product of two vectors of a request sentence and a sentence of each item is calculated. A pair of the sentences having a largest inner product is defined as a retrieved result.

Figure 7:
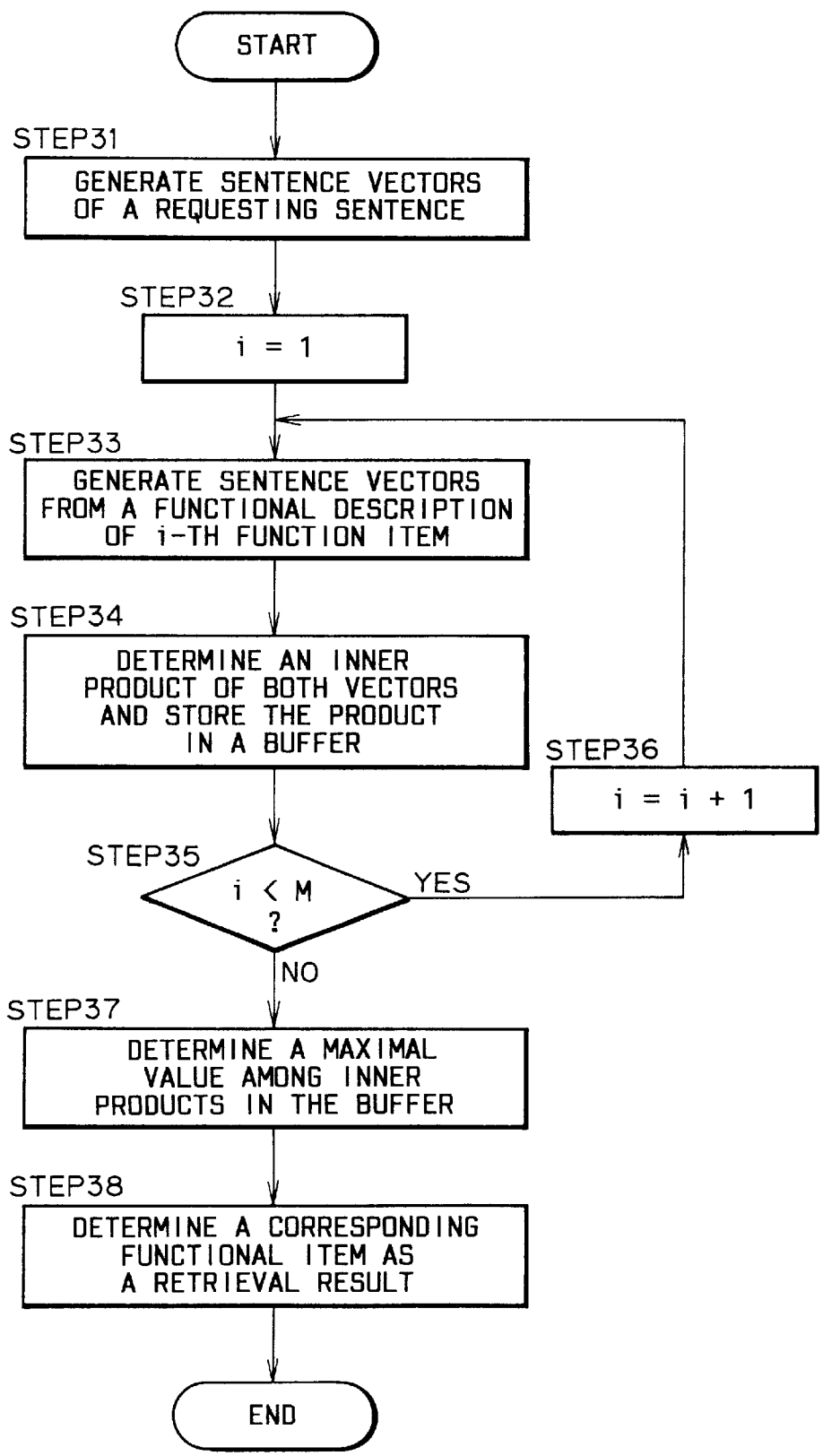
FIG. 7 is a flow chart describing the steps of processing by retrieving means.

FIG. 7 is a flow chart describing an operation procedure of the retrieving means using the vector retrieval technique. The vector generating portion 33 generates a sentence vector QV from the requesting sentence in the same manner as described above (Step 31). An index i is reset to 1 (initial value) (Step 32). The function-description of an i-th functional item is extracted from the function-description database 4 and a sentence vector BVi of the functional item is generated (Step 33). An inner product pi of two sentence vectors QV and BVi is determined and stored in a buffer memory of the memory portion 34 (Step 34). The processing advances to Step 37 if i corresponds to the last functional item (Step 35). If not, the processing returns to Step 33 after increasing the number i by 1 (Step 36). When all inner products of the requesting sentence and respective function items were obtained (Step 35), the maximal inner product is selected among the inner products pj stored in the buffer (Step 37). The functional item corresponding to the index number of the maximal inner product is defined as the retrieved functional item (Step 38).

The retrieval for a functional item corresponding to a requesting sentence "Outputting on paper" will be described as follows:

Two words "Output", "Paper" are extracted from the requesting sentence. The word dictionary 31 contains words in original forms if any inflections. The word vectors are added and normalized to get a sentence vector QV (Step 31). Since the two words "Paper" and "Output" have vectors (1, 1, 0, 0, 1, 0, 0, 0, 1) and (0, 1, 0, 1, 1, 0, 0, 0, 0) respectively, the sentence vector QV of the requesting sentence is determined as follows:

$$QV = (10/L)(1, 2, 0, 1, 2, 0, 0, 0, 1)$$
$$= (3.0, 6.0, 0.0, 3.0, 6.0, 0.0, 0.0, 0.0, 3.0)$$
$$L = (1^2 + 2^2 + 0^2 + 1^2 + 2^2 + 0^2 + 0^2 + 0^2 + 1^2)^{1/2} = 11^{1/2}$$

At Steps 33 and 34, an inner product of the obtained sentence vector QV and a function-descriptive sentence vector of each functional item in the function-description database is calculated. Now, two inner products of the requesting sentence with two functional items "Centering" and "Print" are calculated as follows:

For the functional item "Centering", four words ("Character", "Line", "Center", "Move") are extracted from the function descriptive sentence [Move a Character string to Line Center]. Since the extracted words have respective vectors (1, 1, 0, 0, 0, 0, 1, 0, 1), (0, 1, 1, 1, 0, 0, 0, 0, 0), (0, 0, 1, 1, 0, 0, 0, 0, 0) and (0, 0, 1, 1, 0, 1, 0, 0, 0), the sentence vector BV of the functional item "Centering" is determined as follows:

$$BV = (10/L)(1, 2, 3, 3, 0, 1, 1, 0, 1)$$
$$= (2.0, 3.9, 5.9, 5.9, 0.0, 2.0, 2.0, 0.0, 2.0)$$
$$L = (1^2 + 2^2 + 3^2 + 3^2 + 0^2 + 1^2 + 1^2 + 0^2 + 1^2)^{1/2} = 26^{1/2}$$

An inner product p of QV and BV is calculated as follows:

$p=3.0\times2.0+6.0\times3.9+0.0\times5.9+3.0\times5.9+6.0\times0.0+0.0\times2.0+0.0\times0.0+3.0\times2.0=53.1$ For functional item "Print", the sentence vector BV of the function descriptive sentence [Printout a Document on a Printer] has been already obtained in the preceding example as (2.4, 7.1, 0.0, 0.0, 4.7, 0.0, 0.0, 0.0, 4.7). Accordingly, an inner product p of QV and BV in this case is determined as follows:

$p=3.0\times2.4+6.0\times7.1+0.0\times0.0+3.0\times0.0+6.0\times4.7+0.0\times0.0+0.0\times0.0+0.0\times0.0+3.0\times4.7=92.1$ As described above, the inner product of the requesting sentence and the functional item "Centering" is equal to 53.1 while the inner product of the requesting sentence and the functional item "Print" is equal to 92.1. Accordingly, the requesting sentence ("Outputting on paper") is considered to be more similar to the sentence of the functional item "Print" than the functional item "Centering". The function "Print" is determined as the retrieved function if there is no other functional item that gives an inner product exceeding 92.1. After this, as described before for the case of key-word retrieval, the retrieved function name and its description are displayed for the user and then the selected function "Print", by the request of the user, is executed by the script-executing means 6 according to the action script of the function "Print" stored in advance in the buffer 22.

Thus, the retrieving means retrieves a descriptive sentence of a function item, which agrees in meaning with a requesting sentence inputted by the user and then the script-executing means automatically carries out the retrieved function. Although the above-described embodiment generates sentence vectors for respective functional items from their descriptive sentences at every time of retrieval, it is possible to previously prepare sentence vectors of all functional items and stores them in a separate buffer memory, thus eliminating the need of performing Step 33 for generating sentence vectors for functional items. The efficiency of retrieval operation can be considerably improved since the retrieving means can read necessary sentence vectors of respective functional items in the buffer. Although only one function retrieved at the top level is displayed for the user in the above-mentioned example, it is also possible to display a plurality of functions retrieved at high levels, one of which the user may select.

An on-demand interface system according to the present invention can greatly help a user in operating any multi-functioning devices. When the user is puzzled how to operate the device, he may simply input a requesting sentence. The system retrieves any desired function and executes it on behalf of the user. This may improve the working efficiency. The system is also capable of retrieving by using feature vectors expressing the meanings of the sentences. Namely, the system retrieves a function corresponding to the requesting sentence and automatically executes the retrieved function. Accordingly, the on-demand interface system according to the present invention can considerably improve the quality of users' interface with multi-functioning devices in comparison with the conventional help functions.

We claims:

1. An on-demand interface device comprising input means for inputting a requesting sentence, a function-description database for containing function-descriptive sentences and action scripts indicating procedures for realizing respective functions for respective items, retrieving means for retrieving an item corresponding to the requesting sentence in the function-description database and script executing means for executing the action scripts.

2. An on-demand interface device as defined in claim 1, wherein the retrieving means retrieves data by searching for coincidence of a keyword of the requesting sentence with a keyword of a function-descriptive sentence.

3. An on-demand interface device as defined in claim 1, wherein the retrieving means is provided with a word dictionary for indicating the correlation between words and corresponding words' vectors describing meanings of the words and vector-generating means for generating a sentence vector representing a meaning of a sentence containing a plurality of words by using the word dictionary and retrieves data by searching for a distance of the requesting sentence vector from a function-descriptive sentence vector for each item stored in the function-description database.

4. An on-demand interface device comprising:

an input device for inputting a requesting sentence;

a function-description database which contains function names and action scripts indicating procedures for performing functions denominated by the respective function names;

a controller which determines a similarity of words in the requesting sentence and the function names in order to determine a requested function and which executes one or more of the action scripts to perform the requested function.

5. The on-demand interface of claim 4, wherein the controller searches for coincidence of a keyword of the requesting sentence with a keyword of a function name.

6. The on-demand interface of claim 4, wherein the controller has a word dictionary for indicating a correlation between words and vectors describing meanings of the words, wherein the controller uses the word dictionary to generate a requesting sentence vector representing a meaning of the requesting sentence, and wherein the controller determines a distance of the requesting sentence vector from each of plural vectors in the function-description database.

* * * * *